United States Patent [19]

Enander et al.

[11] 4,331,957
[45] May 25, 1982

[54] TRANSPONDER FOR USE IN LOCATING AVALANCHE VICTIMS

[76] Inventors: Bengt Enander, Ladugårdsvagen 32, Täby; Peter Fuks, Månadsvagen 27, Järfälla; Gunnar Larsson, Eskadervagen 32, Täby, all of Sweden

[21] Appl. No.: 141,362

[22] Filed: Apr. 18, 1980

[30] Foreign Application Priority Data

Apr. 20, 1979 [AT] Austria ................... 2991/79

[51] Int. Cl.³ ............................................. G01S 13/80
[52] U.S. Cl. ........................... 343/6.8 R; 343/5 HM; 343/5 NA
[58] Field of Search ............ 343/5 HM, 5 NA, 6.5 R, 343/6.8 R

[56] References Cited

U.S. PATENT DOCUMENTS 3,745,569  7/1973  Works et al. ................... 343/6.5 SS

FOREIGN PATENT DOCUMENTS 2352807  4/1975  Fed. Rep. of Germany ... 343/6.5 R
2437464  2/1976  Fed. Rep. of Germany ... 343/5 NA Primary Examiner—Tubbesing T. H.
Attorney, Agent, or Firm—Lewis H. Eslinger

[57] ABSTRACT

A transponder adapted to be carried on the body of a person for use in locating avalanche victims is designed for cooperation with a search-transmitter and includes a receiver having a passive non-linear element which, by distortion, produces a higher harmonic from the fundamental frequency received from the search-transmitter and includes metal parts which are connected to the non-linear element and function as a receiver/transmitter antenna tuned to the frequency employed, whereby the side of the transponder facing the human body is covered with a dielectric layer the thickness of which is adjusted in accordance with a transmitted frequency of 1000 MHz and in accordance with the dielectric constant of the layer, and whereby the size of the antenna is adjusted in accordance with the dielectric constant.

6 Claims, 4 Drawing Figures

TRANSPONDER FOR USE IN LOCATING AVALANCHE VICTIMS

A rescue party of 20 persons, when equipped with avalanche probes, will need 20 hours to search a snow slip area of 100×100 meters for survivors. Even a rough search (70% finding chances) requires as long as 4 to 5 hours. 20% of all persons who are buried in an avalanche are killed immediately, and after about 45 minutes half of all those buried in the snow have died.

The above data illustrate the desirability of a system for a faster and more reliable finding of avalanche victims.

The Swiss Pat. No. 514 142 shows a system for protection against theft in shops. The articles to be protected are provided with a passive oscillatory circuit, a so called transponder, which includes a non-linear element, for example a diode. A high-frequency, low-harmonic supervisory signal is transmitted to the place to be supervised, and a receiver is tuned to a harmonic of the transmitted signal. When the transponder is hit by the high-frequency oscillation it reradiates, owing to its non-linear characteristic, harmonics of the transmitted fundamental frequency. The selection of the frequency of the transmitter is dependent on the use of the device and is made at a magnitude of 100 MHz and upwards. If the system is to be used for locating avalanche victims, the patent specification states that lower frequencies will be used, since these are less damped (compared to higher frequencies) by snow.

A disadvantage of the proposed method of finding avalanche victims is that if lower frequencies are utilized correspondingly larger transmitting and receiving antennas should be used. Such antennas are bulky and unwieldy. If the antenna dimensions are not increased the directivity of the antenna becomes bad. If the system is to operate at the proposed lower frequencies the antenna system of the transponder will probably also have to be made correspondingly larger.

The present invention aims at eliminating the drawbacks of the previously known systems of locating avalanche victims.

The transmitter and receiver sets have to be easy to handle and capable of being carried by one person. The same person also has to be able to carry the transmitter and receiver antennas. This speaks in favour of using considerably higher frequencies than those proposed. Yet, too high frequencies cannot be permitted since the snow has a damping effect. Thus, a balancing between these two extremes must be made. According to the invention a frequency of the magnitude of 1000 MHz is chosen.

When one has decided to operate at the said higher frequencies it is found that the place of the transponder on the human body becomes critical. In the electric field associated with these high-frequency oscillations the human body behaves as a reflector for the incident field. The sum of the field inciding upon the human body and the field reflected by the human body is a standing wave having a nodal point situated in the nearest environment of the skin surface. A transponder placed at such a nodal point produces no electric field and consequently no location of the transponder can be made. A known transponder in which the antenna and the diode are embedded in a card of plastic having dimensions of about 70×50×1 mm was found to provide unsatisfactory reradiation if placed in a ski-lift card pocket on the sleeve of a ski jacket. Applicants have now found that if the transponder is placed slightly spaced from the skin surface the energy reradiated by the transponder is increased. There exists a distance d from the body at which the reradiation of energy from the transponder is a maximum. This distance is dependent, inter alia, on the frequency used. By introducing a dielectric between the transponder and the human body the said distance d may be reduced.

Experiments carried out at higher frequencies than those proposed in the said patent specification have also shown that the place of the transponder is critical. If the transponder card is placed in the abovementioned ski-lift card pocket and if the person lies with his arm under his body, i.e. with his back turned upwards, both the radiant energy impinging on the transponder and that possibly radiated from the transponder are damped. Accordingly, it is then impossible to locate the avalanche victim. By placing the transponder, for example on the head or at one of the feet the said disadvantageous shielding of the radiant energy is avoided.

The most preferred place of the transponder is, according to the invention, on the outside of footwear in the form of a ski boot of plastic. As a result, the advantages of the features that (a) the transponder is held spaced from the body, (b) a dielectric layer is present between the transponder and the body, and (c) the transponder is placed on a part of the body which probably will not be positioned under the chest are combined. By placing a transponder on each footwear, for example on each ski boot of plastic, the probability is increased that the transponder will not be shielded by parts of the body which reflect radiation.

In principle, the antenna included in the transponder has to satisfy two criteria, namely that it must have an optimum of sensitivity to the reception of signals at the transmitted fundamental frequency and that it must have an optimum of sensitivity to the retransmission of the first (or some other) harmonic of the received fundamental frequency. In the U.S. Pat. No. 3,731,180 there is shown a system composed of matching units by means of which a transponder may be made optimal for the two frequencies mentioned. The matching circuits are complicated and can easily be damaged mechanically, for which reason they are not suited for use in skiing. The transponder according to the present invention aims at removing this drawback. The transponder according to the present invention includes an antenna the mechanical construction of which is simple and stable, at the same time as it has an optimum of reception and transmission, respectively, at the selected frequencies.

In order that the transponder according to the invention may function at an optimum, i.e. reradiate as great a proportion as possible of the received energy, the antenna included in the transponder must have a length which is adapted to the dielectric existing between the transponder and the human body. For dielectrics the dielectric constant of which is greater than one the antenna length is shortened (compared to the antenna length in air).

Various embodiments of the invention will be described more closely below in connection with the attached drawing, in which.

Figure 1:
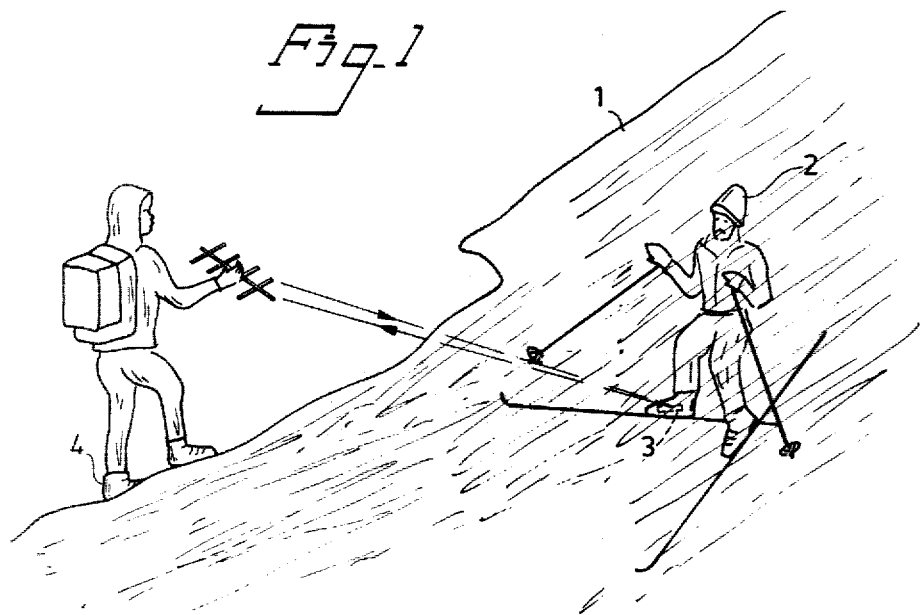
FIG. 1 shows a general view of a system for locating persons buried in an avalanche and equipped with the transponder according to the present invention.

FIG. 1 shows a general view of a system for locating a person 2 buried in an avalanche of snow masses 1 and, inter alia, bearing ski boots of plastic. On the outside of one ski boot and at a level with the ankle or immediately below the latter a transponder 3 according to the invention is fixed. The transponder may be fixed by means of paste or the like.

A person 4 searches the avalanche area and has at his disposal a transmitter and a receiver which are intended for mobile service, i.e. for use during transportation, and which he carries, for example, in a rucksack on his back. The transmitter and the receiver are connected to a transmitter antenna and a receiver antenna, respectively, which preferably are constructed as a structural unit. The searcher 4 searches the avalanche area according to a predetermined searching scheme, for example strip-wise, with the antenna unit directed obliquely downwards and forward. The transmitter is tuned to 915 MHz, the receiver to 1830 MHz. The transmitter delivers an output of 4 W peak power and has a duty cycle (intermittance factor) of 50%. The average power accordingly is 2 W.

The transmitted signal is modulated with a tone within the audible range, in this case with the modulation frequency 1750 Hz. The receiver is of a conventional construction and has a sensitivity of $-116$ dBm. The transmitter antenna is tuned to the transmitter frequency and is of a helix type. The receiver antenna also is of a helix type and is tuned to the receiver frequency. Alternatively, the antennas may consist of Yagi antennas tuned to the respective frequencies but mounted on a common boom. The length of the antennas is about 50 cm.

When the transponder 3 is hit by the transmitted RF radiation it is excited and retransmits RF energy at the receiver frequency. Reradiated energy picked up by the receiver antenna is detected in a conventional way in the receiver and manifests itself as a tone which the searcher 4 hears, for example in headphones. Thanks to the antennas having a high directivity the position of the transponder 3 and thereby that of the avalanche victim can be rapidly determined. In fine direction finding at a close distance from the avalanche victim a damping set may be connected between the receiver and the receiver antenna to improve the directivity. Alternatively, the transmitter power may be damped.

The transmitter and receiver frequencies have been chosen with regard to the considerations earlier mentioned.

In respect of the transponder according to the invention, it is a condition that it has to receive power at 915 MHz and transmit power at 1830 MHz as efficiently as possible. The energy which is radiated at the frequency 1830 MHz is dependent on two factors, namely (1) the strength of the radiation which the transponder is able to receive at 915 MHz from the surrounding electric field. In other words, the transponder has to be placed where the electric field is greatest. How great the electric field will be in turn results from the factors stated above under (a), (b) and (c). The factor (b) means that if a dielectric (with the dielectric constant $\epsilon_r$) is placed between the transponder and the human body d may be made smaller for the same field strength.

The second factor (2) which affects the energy of the radiation which is retransmitted at 1830 MHz is the efficiency with which received radiation power at 915 MHz can be converted into transmitted radiation power at 1830 MHz in the combination consisting of the antenna and the non-linear element. This efficiency may be made an optimum if the impedance of the non-linear element, in the present case a diode, is matched to the impedance of the antenna at 915 MHz as well as at 1830 MHz in the way which is seen from FIG. 2. In the way proposed in the figure which is known from the above-mentioned U.S. patent specification, two separate antennas are impedance-matched to the diode whereby an optimum of production of harmonics is obtained.

Each matching device consists, for example, of a double so called "stub", but being complicated it does not lend itself to a large scale production.

Figure 2:
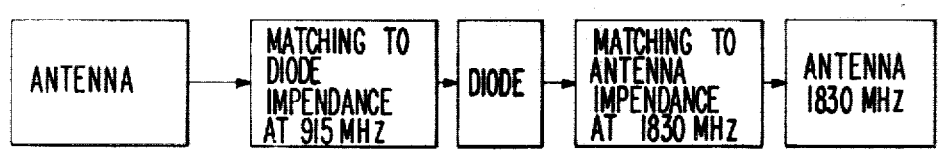
FIG. 2 shows a block diagram for the adjustment of the non-linear element of the transponder antenna for an optimum of sensitivity at the reception of a fundamental frequency and for an optimum of efficiency at the reradiation of the first harmonic of the fundamental frequency.
Figure 3:
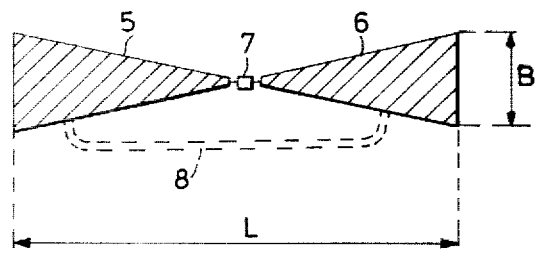
FIG. 3 is a is a plane view from above, in approximately the natural size, of the antenna and the non-linear element of the transponder.

Surprisingly, it has now been found that such an impedance matching device can be entirely omitted it two antennas 5 and 6 having the appearance shown in FIG. 3 and connected with each other by means of the conventional diode 7 are placed on a boot of plastic while a foot is inserted therein. By varying the distances L and B one may arrive at the same efficiency of the harmonics generation as with an optimum system according to the block diagram in FIG. 2. On the other hand, if the transponder is situated in the open air the said optimum response cannot be realized. Accordingly, it is obvious that when the transponder is placed on a boot with the foot inserted therein the generation of harmonics becomes an optimum.

The transponder comprises two plates or sheets 5, 6, each in the shape of an isosceles triangle. The narrow apices of the plates are directed towards each other and are electrically connected with each other through the diode 7. The thickness of the plates may vary but preferably is less than about 1 mm.

The material of the plates is copper, brass or some other suitable material. The diode 7 must be of the high frequency type.

Figure 4:
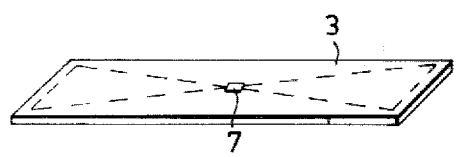
FIG. 4 is a perspective view of the transponder according to the invention in approximately the natural size.

FIG. 4 shows the transponder according to FIG. 3 embedded in a card of plastic, for example. The thickness of the triangular plates of the antenna is about 0.1 mm. The length of the diode is about 3 mm and its diameter is about 1 mm. Therefore, the transponder as a whole has the appearance of a thin and pliable card. A lead 8 shown in FIG. 3 by dashed lines, in the form of a layer of copper may possibly connect the plates 5 and 6 with each other to form a so called DC-by-pass. In a preferred embodiment one face of the card is coated with a layer of paste. The paste layer may be covered with a protective paper. Before the skier starts on a tour he pastes the card on to the outside of the boot, preferably in a position corresponding to a point just below the ankle. If he wants to get increased safety he may place a similar card also on the other boot.

EXPERIMENTAL RESULTS

Three different transponders were produced. Two of the transponders were of the type shown in FIG. 3, while the third was of the type shown in FIG. 2. Each transponder was placed in a vertical position on a vertically rotating axle. The transmitter, receiver and antenna units described in FIG. 1 were utilized. Energy reradiated by the transponder was measured and the highest and the lowest value, respectively, were recorded. These values, expressed in dB, were then converted into the corresponding range that the transponder in question would have in snow with the use of the same transmitter and receiver equipment.

TABLE 1

| Example | Type of transponder | The best direction dB | The best direction Range in snow (m) | The worst direction dB | The worst direction Range in snow (m) |
|---|---|---|---|---|---|
| 1 | Transponder matched to and mounted on boot | 0 | 15 | −18 | 7.5 |
| 2 | Transponder matched to boot and mounted on arm | −20 | 7.0 | −30 | 4.7 |
| 3 | Air-matched transponder in air* | −10 | 10.2 | −10 | 10.2 |
| 4 | Air-matched transponder mounted on boot | −10 | 10.2 | −30 | 4.7 |
| 5 | Air-matched transponder mounted on arm | −16 | 8.1 | −30 | 4.7 |
| 6 | Matched diode accord. to FIG. 2* | 0 | 15 | 0 | 15 |

*omnidirectional

The transponders according to the examples 1 to 5 were made by etching a copper laminate having a thickness of 0.01 mm. The two triangular plates 5, 6 were connected with each other through a so called Schottky-barrier-diode of the type Hewlett-Packard 5082-2835. The transponder in the examples 1 and 2 had a length of L=129 mm and a width of B=35 mm. The antenna in the transponder according to the examples 3 to 5 had L=175 mm, B=38 mm. By the expression "transponder matched to boot" is meant that the antenna length L has been matched to a dielectric of plastic, more particularly to a conventional ski boot. By the expression "air-matched transponder" is meant that the antenna length L is matched so as to be used in air. By the expression "matched diode" is meant that the diode is matched in accordance with the specification section relating to FIG. 2.

In example 1 the transponder was placed at a low point on the outside of a boot, and the highest and the lowest value, respectively, of reradiated energy at 1830 MHz were read. The highest measured value was used as a reference level (=0 dB) which in avalanche snow corresponds to a range of 15 meters. The lowest measuring result was −18 dB which corresponds to a range in avalanche snow of 7.5 meters. The card of example 1 was then placed on the arm of a test person, and the best and the worst ranges, respectively, corresponded to 7.0 and 4.7 meters, respectively, in avalanche snow. The transponder according to example 3 was allowed to rotate freely, and as expected the strength of the reradiation was equal in all directions. Experiments were made by varying L and B, but at best the strength of the reradiated energy was 10 dB less than the optimum according to example 1.

The antenna according to example 3, matched to be used in air, was in example 4 placed on a boot of the same kind as was used in example 1 and in example 5 placed on the same arm as was utilized in example 2. The experimental results show that a transponder matched to air on a boot or arm, respectively, is at least 10–16 dB worse than the optimum transponder according to example 1. Example 2 also shows that a transponder matched to a boot and carried on an arm is at least 20 dB worse than the optimum transponder according to example 1, matched to a boot and carried precisely on the boot.

Example 6 shows that a transponder of the construction according to FIG. 2 which rotates freely in air has a range which corresponds to the greatest range of the transponder in example 1.

From table 1 it is seen that both in the best direction and in the worst direction the transponder matched to a boot and applied to the boot is best.

Six boots with cards according to FIG. 4 pasted thereon were set out within an area of 100×100 meters. The boots were placed at various depths of snow. A searcher equipped with the transmitter, receiver and antenna units described above searched the area in 20 minutes. All the boots were found.

We claim:

1. A transponder to be carried on the body of a person for use in locating avalanche victims, which transponder is designed for cooperation with a search-transmitter which generates a signal with a fundamental frequency of approximately 1000 MHz, said transponder comprising a receiver having a passive non-linear element which produces a higher harmonic by distortion of the fundamental frequency received from the search transmitter; metal parts connected to the non-linear element and which function as a receiver/transmitter antenna tuned to the frequency employed; and a dielectric layer covering a side of the transponder facing the body, the thickness of the layer being substantially adapted for use with the fundamental and a reradiated harmonic frequency and to the dielectric constant of the layer, the size of the antenna being substantially adapted for use with said dielectric constant.

2. A transponder according to claim 1, wherein the dielectric layer includes an article of clothing on to which the transponder is fixed.

3. A transponder according to claim 2, wherein the dielectric layer is part of a ski boot.

4. A transponder according to claim 1, wherein the transponder is inserter into a plastic card which is fixed to the dielectric layer.

5. A transponder according to claim 3, wherein the transponder is inserted into a side of a ski boot made from plastic.

6. A transponder according to one of claims 1, 2, 3, 4 or 5, wherein the metal parts comprise two triangular plates, the apices of which are connected to each other by means of a diode.

* * * * *